May 20, 1952 P. S. BROOKS ET AL 2,597,118
SUPPORT FOR PRIMARY GALVANIC CELL ELECTROLYTE
Filed Aug. 25, 1949
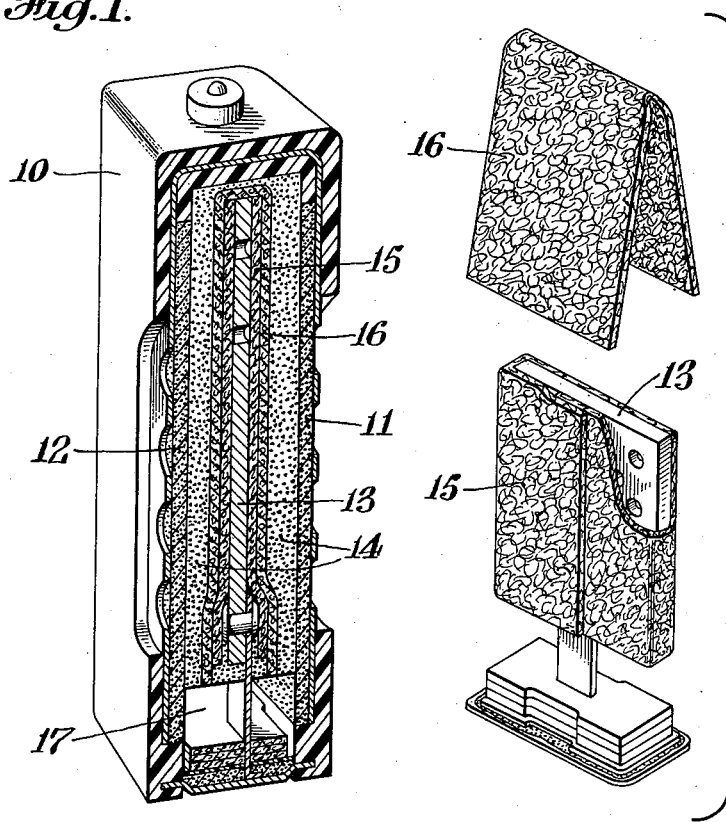
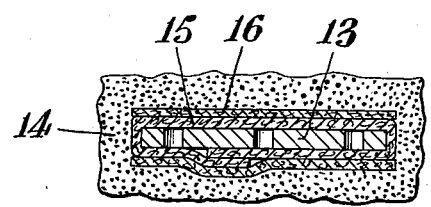
INVENTORS
PAUL S. BROOKS
ERWIN A. SCHUMACHER
BY D. C. Harrison
ATTORNEY Patented May 20, 1952

2,597,118

UNITED STATES PATENT OFFICE 2,597,118

SUPPORT FOR PRIMARY GALVANIC CELL ELECTROLYTE

Paul S. Brooks, Lakewood, and Erwin A. Schumacher, Parma, Ohio, assignors, by mesne assignments, to Union Carbide and Carbon Corporation, a corporation of New York Application August 25, 1949, Serial No. 112,204

5 Claims. (Cl. 136—144)

This invention relates to a support for a primary galvanic cell electrolyte.

In alkaline primary galvanic cells of the so-called "dry" type, the electrolyte may be immobilized by the incorporation into it of a starch, such as cornstarch, forming a gel-like structure usually referred to as a paste. This paste must be sufficiently moist to provide adequate contact with the active surfaces of the electrodes, otherwise the cell would not operate effectively, but it must not liberate so much liquid during storage or subsequent cell action as to give rise to leakage problems.

Although no great difficulty is encountered in formulating an electrolyte paste which initially meets this requirement, difficulty is encountered in maintaining the paste in the desired moist but not liquid condition during and after use of the cell. In United States Patent 1,784,592, issued December 9, 1930, upon application of George W. Heise and Erwin A. Schumacher this problem was recognized, and it is there proposed to prevent undue liquefaction by distributing a quantity of fibrous material such as glass wool, asbestos or excelsior uniformly throughout the electrolyte paste. A difficulty with this proposal is that a paste so modified becomes stiff, and difficult to fill into small, irregularly shaped cavities, even after it has been liquefied by heating. Furthermore, this expedient has unfortunately proved ineffective in that type of cell in which the gelatinized electrolyte and fibrous support are subjected to compression when the interelectrode space fills with the solid by-products resulting from anodic dissolution.

Such a cell is described and claimed in United States patent application Serial No. 52,018, filed September 30, 1948, by Paul A. Marsal and Russell P. Fox. In contrast with conventional galvanic cells in which all of the active materials are present before discharge, and in which no significant increase in internal volume is encountered, these cells, employing air depolarized cathodes, require a continuous absorption of atmospheric oxygen for their operation. This oxygen appears as zinc oxide in the by-products of the cell reaction, producing a volume increase equivalent to the difference in volume between the anode metal and the oxide. This increase in volume may, under some conditions amount to as much as 10% to 15% of the electrolyte volume. As the by-product zinc oxide increases in thickness, the supporting fibers shear the gel into numerous small pieces with liberation of excessive amounts of free liquid, frequently eventuating in leakage from the cell.

Omission of paste supporting means on the other hand, not only leads to excessive liquefaction or syneresis during periods of idleness and accelerated leakage during and after use but may have serious consequences as well in the operation of a cell of this type leading, as hereinafter shown, to substandard operation.

It is one of the principal objects of this invention to provide a support for a paste electrolyte in a primary galvanic cell, which support prevents excessive liquefaction and hence leakage of the electrolyte paste. A further object of the invention is to provide a support for a paste electrolyte in a primary galvanic cell which improves the discharge characteristics of the cell.

The invention by means of which these objects are achieved will be described with reference to the accompanying drawing, in which:

Fig. 1 is a vertical section of a primary galvanic cell containing the electrolyte support of the invention;

Fig. 2 is an exploded view of an anode and electrolyte support for use in a cell of the type shown in Fig. 1; and Fig. 3 is a horizontal section of the cell shown in Fig. 1, part being broken away.

In accordance with the invention, an electrolyte paste for a primary galvanic cell is supported by fibers of cellulose which have been matted so as to form a bibulous sheet. Thus the electrolyte support is not distributed throughout the paste as in the Heise et al. patent referred to but may be placed in a desired location in the cell.

Referring to the drawing, there is shown in Fig. 1 a primary galvanic cell 10, having non-consumable electrodes 11, 12 mounted in its opposite side walls. A consumable zinc electrode 13 is positioned between the non-consumable electrodes 11, 12, and in the intervening space are an immobilized paste electrolyte 14 and an electrolyte support comprising one or more layers 15, 16 of sheeted cellulose fibre of suitable thickness. The layers 15, 16 may be perforated for greater ease of paste introduction, but if the paste viscosity is low, such perforations may be found unnecessary. Conveniently the support is retained in its desired location by wrapping it about the electrode 13 as more clearly shown in Fig. 2 but it is not essential that the support make physical contact with this electrode. The paste electrolyte 14 substantially saturates the support. An air space 17 is provided to permit escape of internally generated gas and entrapped air through the carbon electrodes.

Although the electrolyte support of this invention preferably consists of fibers of regenerated cellulose such as rayon staple fibers, unregenerated cellulose fibers may be mixed with the regenerated cellulose fibers for improving the mechanical strength of the matted support. Preferred materials are the so-called rayon papers available under the trade names, "Aldex" and "Viskon." These materials show less area shrinkage in alkali than ordinary paper, and therefore can be positioned more accurately in the cell. They liberate less liquid under compression than other adsorptive cellulose sheets, consequently lessen the danger of leakage from the cell. Since they wet very rapidly and uniformly in contact with electrolyte they facilitate introduction of the paste electrolyte into the cell and minimize entrapment of air.

Many tests have been made which show that by utilizing the electrolyte support of the invention it is possible to reduce the viscosity of the electrolyte paste to such an extent that, unsupported, the electrolyte would exhibit excessive liquefaction. However, when the support of the invention is used, liquefaction of electrolyte is controlled. The fibres being matted and sorptive of electrolyte resist compression, and there is no significant tendency for the paste to be cut; therefore there is no excessive liquefaction of the paste, and leakage from the cell is greatly reduced. This is particularly true when the support is composed of regenerated cellulose fibers.

Data obtained from typical tests of materials used as electrolyte supports in primary galvanic cells of the type described and claimed in the patent application of Paul A. Marsal and Russell P. Fox referred to above are set forth in Table I. These cells are provided with a pair of air-depolarized carbon electrodes between which is a zinc electrode, a paste caustic electrolyte occupying the inter-electrode space. In the test cells the electrolyte support was wrapped around the zinc electrode. The test cells were discharged through a 20 ohm resistance for 12 hours a day, discharge being discontinued when the voltage of the cells dropped to 0.9 volt. The total hours of discharge to cause the voltage to drop to this point is referred to as "hours of service." Each of the cells tested was constructed with less than the optimum air space, accentuating leakage. After discharge had been completed, the cells were placed in stoppered bottles (to prevent desiccation, and therefore decrease in paste volume) and examined at frequent intervals for evidence of leakage. To be considered non-leaking in these tests, the specimens were required to show no post-discharge leakage in three to four weeks. It will be seen from this data that the best combination of service life and resistance to leakage is obtained in cells containing supports composed of regenerated cellulose fiber.

Table I

| Type of Paste Support | Hrs. of Service | Leakage after Discharge | |
|---|---|---|---|
| | | Nonleaking cells | Leaking cells |
| Regenerated Cellulose [1] | 86 | 15 | 5 |
| Fibrous glass matte | 95 | 3 | 12 |
| Woven Nylon | 90 | 3 | 24 |
| Nylon staple fiber | 83 | 0 | 12 |
| Carded vinyl resin fiber | 88 | 0 | 4 |

[1] "Aldex" and "Viskon" rayon-fiber sheets.

In general it was found that cells constructed with non-sorptive type paste supports not only were characterized by a markedly greater incidence of leakage but exhibited this failure earlier than did the cells containing supports of cellulose. This is illustrated by the results of still other tests on cells of the type described above using different materials for supporting the paste electrolyte.

Table II

| Type of Paste Support | Hrs. of Service (Average) | Days to Leakage After Discharge |
|---|---|---|
| Regenerated Cellulose: | | |
| (a) "Aldex" | 79 | 7 cells—no leakage in 3 weeks. 1 cell after 7 days. 1 cell after 8 days. 1 cell after 19 days. |
| (b) "Viskon" | 80 | 8 cells—no leakage in 3 weeks. 1 cell after 10 days. 1 cell after 17 days. |
| Woven Nylon | 83 | 1 cell—no leakage in 3 weeks. 3 cells after 2 days. 6 cells after 6 days. |
| Fibrous glass matte | 84 | 2 cells—no leakage in 3 weeks. 3 cells after 5 days. 3 cells after 6 days. 1 cell after 7 days. 1 cell after 9 days. |

Tests conducted in the same way as those referred to in Tables I and II were made to determine, from the standpoint of cell performance, the optimum thickness of the electrolyte support when swelled with electrolyte. Typical data observed in such tests are set forth in Table III.

Table III

| Inter-electrode Space Occupied by Swelled Support | Avg. Hrs. of Service | Leakage after Discharge | |
|---|---|---|---|
| | | Nonleaking Cells | Leaking Cells |
| 0 | 38 | 0 | 9 |
| 30 to 35 per cent | 84 | 10 | 8 |
| 40 to 45 per cent | 85 | 7 | 5 |
| 55 to 60 per cent | 83 | 9 | 4 |
| 75 per cent | 78 | 5 | 0 |
| 90 per cent | 57 | 5 | 0 |
| 100 per cent | 17 | 5 | 0 |

The data presented in Table III indicate that for optimum cell performance and protection against leakage, the electrolyte support of the invention should occupy, when swelled with electrolyte, 30% to 80% of the inter-electrode space, with occupancy of 40% to 70% of this space being most generally preferred.

It is apparent from the test results that it is not essential that the electrolyte support of the invention make tight contact with either electrode surface. This is in direct contrast to the conventional primary galvanic cell construction in which a liner or separator is pressed firmly against one or both electrodes.

Cells provided with electrolyte supports of the character and thickness demonstrated by test to be most satisfactory exhibited on examination uniform formation of zinc oxide scale on the zinc electrode in smooth, porous, parallel layers, free from buckling, thus ensuring continuity of contact between the zinc electrode surface and the electrolyte held in the porous scale. In many instances, cells containing little or no support material become very irregular in operation, and areas of poor contact between anode and electrolyte may be observed as a result of buckling of the scale.

Although the invention may be used generally in any primary galvanic cell wherein a paste electrolyte is compressed between a consumable electrode and a non-consumable electrode, it will probably find its greatest use in the type of air-depolarized cell described and claimed in the Marsal and Fox application referred to above. Cells of this type present special problems. For instance, they may adsorb appreciable quantities of water vapor from the ambient atmosphere when humidity rises with the result that the electrolyte volume may be increased to the point where liquid fills the air space, creating internal pressure and causing solution to leak from the cell. Furthermore, reaction between zinc residues and electrolyte paste leads to evolution of hydrogen gas, the release of which from the cell is blocked by excessive amounts of liquefied paste. The use of the support of this invention overcomes these problems by preventing excessive liquefaction.

We claim:

1. In an air-depolarized primary galvanic cell having a consumable electrode, a non-consumable electrode, and an alkaline paste electrolyte subject to syneresis on discharge of the cell, an electrolyte-sorptive support serving to prevent syneresis of such electrolyte paste and being composed of matted fibers of cellulose, said support being positioned between said electrodes but when wet with electrolyte occupying less than the entire available space between said electrodes.

2. In an air-depolarized primary galvanic cell having an alkaline paste electrolyte subject to syneresis on discharge of the cell, a consumable electrode, and a non-consumable electrode, an electrolyte-sorptive support serving to prevent syneresis of such electrolyte paste, being composed of matted fibers of regenerated cellulose, said support being positioned between said electrodes but when wet with electrolyte occupying less than the entire available space between said electrodes.

3. In an air-depolarized primary galvanic cell having an alkaline paste electrolyte, a non-consumable electrode and a consumable electrode, an electrolyte-sorptive support for such electrolyte, said support being composed of matted fibers of regenerated cellulose and occupying, when wet with electrolyte, 30% to 80% of the available space between said consumable and non-consumable electrodes.

4. In an air-depolarized primary galvanic cell having an alkaline paste electrolyte, a non-consumable electrode and a consumable electrode, an electrolyte-sorptive support for such electrolyte, said support being composed of matted fibers of regenerated cellulose and occupying, when wet with electrolyte, 40% to 70% of the available space between said consumable and non-consumable electrodes.

5. In an air-depolarized primary galvanic cell having an alkaline paste electrolyte, a consumable electrode, and an air-depolarized carbon electrode, an electrolyte-sorptive support for such electrolyte, said support being composed of matted fibers of regenerated cellulose and occupying, when wet with electrolyte, 40% to 70% of the available space between said electrodes.

PAUL S. BROOKS.
ERWIN A. SCHUMACHER.

REFERENCES CITED

The following references are of record in the file of this patent:

UNITED STATES PATENTS

| Number | Name | Date |
| --- | --- | --- |
| 1,548,539 | Martus et al. | Aug. 4, 1925 |
| 2,034,817 | Johnson | Mar. 24, 1936 |
| 2,040,255 | Gordon | May 12, 1936 |
| 2,180,839 | Schumacher et al. | Nov. 21, 1939 |
| 2,463,316 | Ruben | Mar. 1, 1949 |
| 2,463,565 | Ruben | Mar. 8, 1949 |
| 2,473,546 | Ruben | June 21, 1949 |

FOREIGN PATENTS

| Number | Country | Date |
| --- | --- | --- |
| 371,502 | Great Britain | Apr. 28, 1932 |
| 579,326 | Great Britain | July 31, 1946 |